(12) United States Patent
Mathews, Jr. et al.

(10) Patent No.: US 12,352,216 B2
(45) Date of Patent: Jul. 8, 2025

(54) HIGH BANDWIDTH CONTROL OF TURBOFAN/TURBOPROP THRUST RESPONSE USING EMBEDDED ELECTRIC MACHINES

(71) Applicant: General Electric Company, Schenectady, NY (US)

(72) Inventors: Harry Kirk Mathews, Jr., Clifton Park, NY (US); Stefan Joseph Cafaro, Chapel Hill, NC (US); Brendon Leeker, Cincinnati, OH (US); Kevin Graziano, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/657,325

(22) Filed: May 7, 2024

(65) Prior Publication Data
US 2024/0287943 A1    Aug. 29, 2024

Related U.S. Application Data

(62) Division of application No. 17/942,525, filed on Sep. 12, 2022, now Pat. No. 12,006,880.

(51) Int. Cl.
*F02C 9/26* (2006.01)
*F02C 6/00* (2006.01)
(Continued)

(52) U.S. Cl.
CPC .......... *F02C 9/26* (2013.01); *F02C 6/00* (2013.01); *F02C 9/28* (2013.01); *F02C 9/48* (2013.01); *F02C 9/56* (2013.01)

(58) Field of Classification Search
CPC ...... F02C 9/26; F02C 9/28; F02C 9/48; F02C 9/56; F02C 6/00; F05D 2260/81; F05D 2220/76
See application file for complete search history.

(56) References Cited

U.S. PATENT DOCUMENTS 3,686,485 A    8/1972  Wiley
3,750,782 A    8/1973  Costantini
(Continued)

FOREIGN PATENT DOCUMENTS

CN    103835881    6/2014
CN    103850802    6/2014
(Continued)

OTHER PUBLICATIONS

U.S. Appl. No. 17/168,725; Final Rejection mailed Jul. 24, 2024; (pp. 1-26).
(Continued)

*Primary Examiner* — William H Rodriguez
(74) *Attorney, Agent, or Firm* — Smith Gambrell & Russell LLP

(57) ABSTRACT

Systems and methods for high bandwidth control of thrust response for turbofan or turboprop engines are provided. Such systems and methods include an engine control system that processes a rate command and a feedback signal from an engine to generate separate fuel and electric machine control signals that respectively control fuel and electric machine dynamics of the engine to produce engine dynamics that result in desired thrust response.

18 Claims, 11 Drawing Sheets

(51) Int. Cl.
 F02C 9/28 (2006.01)
 F02C 9/48 (2006.01)
 F02C 9/56 (2006.01)

(56) References Cited

U.S. PATENT DOCUMENTS

| | | | |
|---|---|---|---|
| 4,425,614 | A | 1/1984 | Barron |
| 5,915,917 | A | 6/1999 | Eveker |
| 6,010,303 | A | 1/2000 | Feulner |
| 6,059,522 | A | 5/2000 | Gertz |
| 6,979,979 | B2 | 12/2005 | Xu |
| 7,011,498 | B2 | 3/2006 | Vos |
| 8,036,805 | B2 | 10/2011 | Mahoney |
| 8,825,227 | B2 | 9/2014 | Saint-Marc |
| 8,866,318 | B2 | 10/2014 | Langford |
| 9,109,538 | B2 | 8/2015 | Maalioune |
| 9,257,838 | B2 | 2/2016 | Gataric |
| 9,267,438 | B2 | 2/2016 | Dooley |
| 9,327,600 | B1 | 5/2016 | Nehmeh |
| 9,428,267 | B2 | 8/2016 | Devita |
| 9,441,547 | B2 | 9/2016 | Cai |
| 9,533,636 | B2 | 1/2017 | Brouwer |
| 9,561,860 | B2 | 2/2017 | Knapp |
| 9,630,510 | B2 | 4/2017 | Sukumaran |
| 9,643,729 | B2 | 5/2017 | Walter-Robinson |
| 9,688,414 | B2 | 6/2017 | Burns |
| 9,828,917 | B2 | 11/2017 | Klonowski |
| 9,889,746 | B2 | 2/2018 | Wolff |
| 10,023,319 | B2 | 7/2018 | Teicholz |
| 10,260,471 | B2 | 4/2019 | Huang |
| 10,308,353 | B2 | 6/2019 | Swann |
| 10,392,119 | B2 | 8/2019 | Niergarth |
| 10,435,165 | B2 | 10/2019 | Swann |
| 10,436,059 | B2 | 10/2019 | Liu |
| 10,442,547 | B2 | 10/2019 | Miller |
| 10,450,886 | B2 | 10/2019 | Sennoun |
| 10,569,759 | B2 | 2/2020 | Gansler |
| 10,583,931 | B2 | 3/2020 | Cline |
| 10,644,630 | B2 | 5/2020 | Smith |
| 10,676,199 | B2 | 6/2020 | Hon |
| 10,711,693 | B2 | 7/2020 | Miller |
| 10,737,798 | B2 | 8/2020 | Misfeldt |
| 10,906,634 | B2 | 2/2021 | Rhoden |
| 11,007,955 | B2 | 5/2021 | Klemen |
| 11,725,594 | B2 | 8/2023 | Mcquiston |
| 12,006,880 | B2 * | 6/2024 | Mathews, Jr. ............ F02C 9/28 |
| 2003/0115883 | A1 | 6/2003 | Myers |
| 2005/0225303 | A1 | 10/2005 | Xu |
| 2006/0225431 | A1 | 10/2006 | Kupratis |
| 2010/0138089 | A1 | 6/2010 | James |
| 2013/0086919 | A1 | 4/2013 | Dooley |
| 2013/0247579 | A1 | 9/2013 | Morawski |
| 2014/0216047 | A1 | 8/2014 | Morisaki |
| 2014/0271114 | A1 | 9/2014 | Phillips |
| 2015/0321752 | A1 | 11/2015 | Trull |
| 2016/0325826 | A1 | 11/2016 | Swann |
| 2017/0044989 | A1 | 2/2017 | Gemin |
| 2017/0057650 | A1 | 3/2017 | Walter-Robinson |
| 2017/0175565 | A1 | 6/2017 | Sennoun |
| 2017/0187311 | A1 | 6/2017 | French |
| 2017/0226933 | A1 | 8/2017 | Klonowski |
| 2017/0248080 | A1 | 8/2017 | Chevalier |
| 2017/0324360 | A1 | 11/2017 | Cline |
| 2017/0335710 | A1 | 11/2017 | Klemen |
| 2017/0342855 | A1 | 11/2017 | Hon |
| 2018/0050807 | A1 | 2/2018 | Kupiszewski |
| 2018/0065755 | A1 | 3/2018 | Teicholz |
| 2018/0073437 | A1 | 3/2018 | Simonetti |
| 2018/0128182 | A1 | 5/2018 | Hayama |
| 2018/0141674 | A1 | 5/2018 | Bailey |
| 2018/0187604 | A1 | 7/2018 | Poumarede |
| 2018/0194483 | A1 | 7/2018 | Schwöller |
| 2018/0319283 | A1 | 11/2018 | Battin |
| 2018/0354631 | A1 | 12/2018 | Adibhatla |
| 2018/0354632 | A1 | 12/2018 | Hon |
| 2018/0363564 | A1 | 12/2018 | Geneste |
| 2018/0370646 | A1 | 12/2018 | Hon |
| 2019/0001955 | A1 | 1/2019 | Gansler |
| 2019/0003398 | A1 | 1/2019 | Gibson |
| 2019/0136768 | A1 | 5/2019 | Harvey |
| 2019/0165708 | A1 | 5/2019 | Smith |
| 2019/0186284 | A1 | 6/2019 | Orkiszewski |
| 2019/0233125 | A1 | 8/2019 | Knight |
| 2019/0264617 | A1 | 8/2019 | Barmichev |
| 2019/0323426 | A1 | 10/2019 | Mackin |
| 2019/0345837 | A1 | 11/2019 | Bacic |
| 2019/0375512 | A1 | 12/2019 | Ribeiro |
| 2020/0010205 | A1 | 1/2020 | Swann |
| 2020/0056546 | A1 | 2/2020 | Terwilliger |
| 2020/0056551 | A1 | 2/2020 | Epstein |
| 2020/0079513 | A1 | 3/2020 | Pastouchenko |
| 2020/0095939 | A1 | 3/2020 | Epstein |
| 2020/0182158 | A1 | 6/2020 | Kupratis |
| 2020/0248619 | A1 | 8/2020 | Romero |
| 2020/0284265 | A1 | 9/2020 | Reepmeyer |
| 2020/0361611 | A1 | 11/2020 | Klemen |
| 2020/0392906 | A1 | 12/2020 | Turner |
| 2021/0025339 | A1 | 1/2021 | Terwilliger |
| 2021/0047970 | A1 | 2/2021 | Collopy |
| 2021/0108569 | A1 | 4/2021 | Lewis |
| 2022/0042465 | A1 | 2/2022 | Swann |
| 2022/0063824 | A1 | 3/2022 | Hiett |
| 2022/0063826 | A1 | 3/2022 | Hiett |
| 2022/0065177 | A1 * | 3/2022 | McQuiston ............... F02C 9/48 |
| 2023/0278719 | A1 | 9/2023 | Cafaro |
| 2023/0313744 | A1 * | 10/2023 | Wang ........................ F02C 7/36 |
| | | | 60/39.281 |
| 2024/0084740 | A1 * | 3/2024 | Mathews, Jr. ............ F02C 6/00 |

FOREIGN PATENT DOCUMENTS

| | | |
|---|---|---|
| EP | 3770399 | 1/2021 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| JP | 5923515 | 5/2016 |
| KR | 20040018612 | 3/2004 |
| WO | 2008049426 | 5/2008 |
| WO | 2008085535 | 7/2008 |
| WO | 2014085236 | 6/2014 |
| WO | 2015092269 | 6/2015 |

OTHER PUBLICATIONS

Budharaju Balaji, N Om Prakash Raj, Mahesh P. Padwale, GP Ravishankar, "Modelling, Analysis and Flight Testing of a Military Turbofan Engine Under Windmilling Conditions", Dec. 5-6, 2019, ASME, GTINDIA2019-2353, pp. 1-5. (Year: 2019).

(56) References Cited

OTHER PUBLICATIONS https://www.radioworld.com/news-and-business/the-abcs-of-swr-vswr-reflected-power-and-return-loss; The ABCs of SWR, VSR, Reflected Power and Return Loss; Mike Hendrickson; Dec. 9, 2015; (14 pgs.).
Rachakonda, Anil, et al., "Log amps and directional couplers enable VSWR detection", www.rfdesign.com, Jan. 2007, p. 28-34.
Understanding Cable and Antenna Analysis—https://www.anritsu.com/en-us/test-measurement/solutions/en-us/understanding-cable-and-antenna-analysis; (7 pgs.).
U.S. Appl. No. 17/155,814; Final Office Action mailed Jan. 17, 2023; (pp. 6).
U.S. Appl. No. 17/155,814; Non-Final Office Action mailed Apr. 14, 2022; (pp. 14).
U.S. Appl. No. 17/155,814; Notice of Allowance mailed Mar. 30, 2023; (pp. 8).
U.S. Appl. No. 17/168,725; Advisory Action mailed Dec. 9, 2022; (pp. 3).
U.S. Appl. No. 17/168,725; Final Office Action mailed Aug. 18, 2022; (pp. 25).
U.S. Appl. No. 17/168,725; Non-Final Office Action mailed Feb. 16, 2022; (pp. 21).
U.S. Appl. No. 17/687,832, Application filed Mar. 7, 2022, entitled "Method and Apparatus for Controlling Electrical Machines Operating with a Turbine Engine,".
U.S. Appl. No. 17/942,525; Non-Final Action mailed Nov. 7, 2023; (pp. 10).
U.S. Appl. No. 17/942,525; Restriction Requirement Action mailed Sep. 13, 2023; (pp. 6).
U.S. Appl. No. 17/942,525; Restriction Requirement mailed Sep. 13, 2023; (pp. 6).
U.S. Appl. No. 17/155,814; Final Rejection mailed Jan. 17, 2023; (pp. 1-6).
U.S. Appl. No. 17/155,814; Notice of Allowance and Fees Due (PTOL-85) mailed Mar. 30, 2023; (pp. 1-8).
U.S. Appl. No. 17/168,725; Final Rejection mailed May 12, 2023; (pp. 1-23).
U.S. Appl. No. 17/168,725; Final Rejection mailed Aug. 18, 2022; (pp. 1-25).
U.S. Appl. No. 17/168,725; Non-Final Rejection mailed Jan. 20, 2023; (pp. 1-25).
U.S. Appl. No. 17/168,725; Non-Final Rejection mailed Nov. 22, 2023; (pp. 1-22).
U.S. Appl. No. 17/687,832; Final Rejection mailed Mar. 14, 2024; (pp. 1-16).
U.S. Appl. No. 17/687,832; Non-Final Rejection mailed Oct. 12, 2023; (pp. 1-10).
U.S. Appl. No. 17/942,525; Notice of Allowance and Fees Due (PTOL-85) mailed Mar. 4, 2024; (pp. 1-8).
U.S. Appl. No. 17/687,832; Non-Final Rejection mailed Nov. 20, 2024; (pp. 1-24).

* cited by examiner

HIGH BANDWIDTH CONTROL OF TURBOFAN/TURBOPROP THRUST RESPONSE USING EMBEDDED ELECTRIC MACHINES

CROSS-REFERENCE TO RELATED APPLICATION(S)

This application is a divisional of U.S. patent application Ser. No. 17/942,525, filed Sep. 12, 2022, which is hereby incorporated by reference in its entirety.

TECHNICAL FIELD

These teachings relate generally to jet engines and more particularly to high bandwidth control of thrust response for a turbofan or turboprop using embedded electric machines.

BACKGROUND

Turbine jet engines such as turbofans and turboprops typically have trust control systems that rely on controlling the amount and timing of fuel supplied to the engine. Additionally, these engines often are coupled to electrical machines (e.g., controllable electric motor/generator) that can provide additional thrust power to the engine, transfer power between shafts in a multi-spool engine, and/or generate electricity for use by the engine or other aircraft systems. Efficient operation of the thrust control and electric machines can result in effective operation of the aircraft and engines.

BRIEF DESCRIPTION OF THE DRAWINGS

Various needs are at least partially met through provision of the high bandwidth control of turbofan/turboprop thrust response using embedded electric machines described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
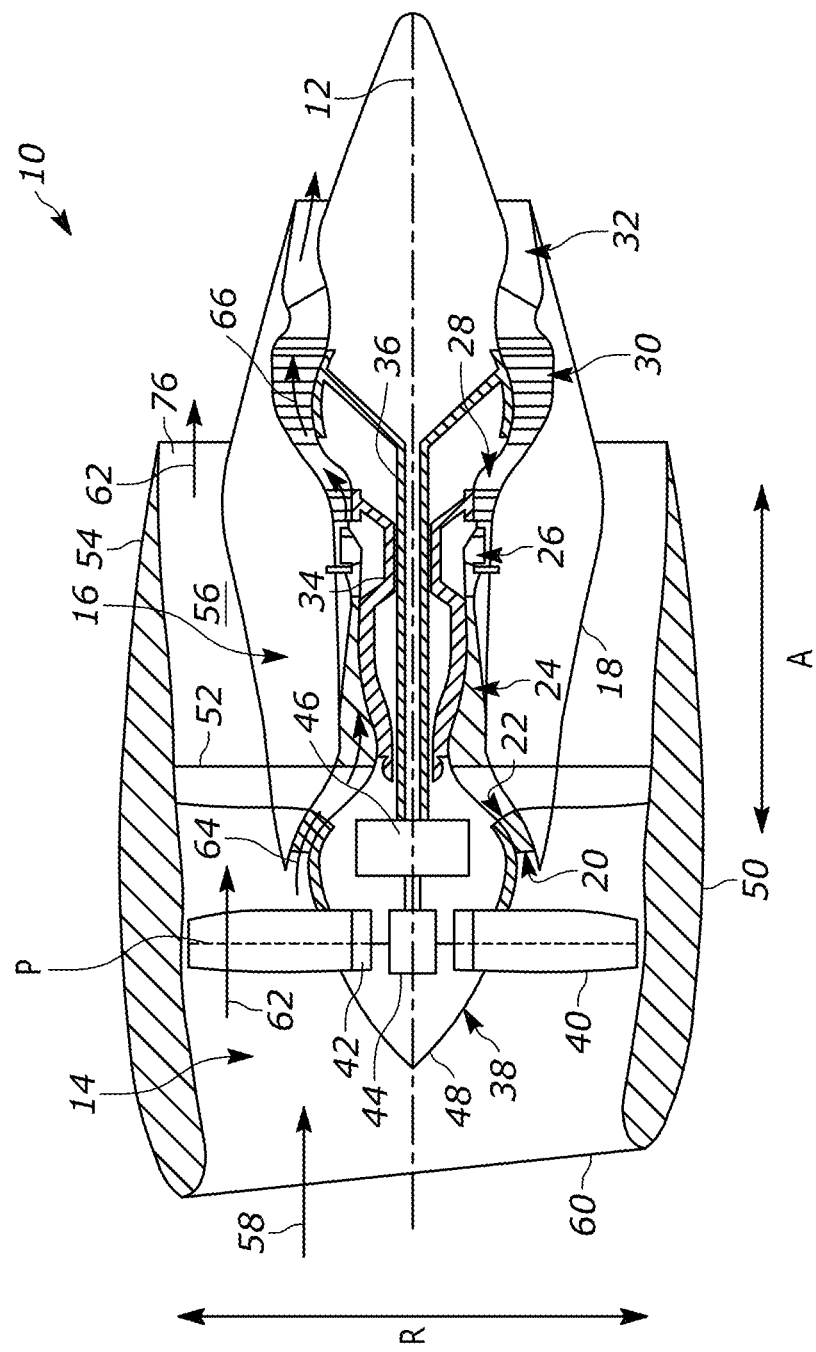
FIG. 1 is a cross-sectional view of a gas turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Existing turbofan and turboprop jet engines rely primarily on fuel-based control systems to achieve a desired engine thrust and thrust trajectory. However, the fuel-based control systems can be slow to respond to errors in the thrust response identified from engine feedback. This slow response can result in excess fuel usage, sluggish speed response or poor speed holding, increased engine wear, and other downsides when compared with an idealized response from the engines. These are all significant challenges in the context of aviation application settings.

Generally speaking, the various aspects of the present disclosure can be employed with engine control systems and related methods that allocate thrust control between a fuel controller and an electric machine controller to provide a tighter control of thrust response, minimize thrust asymmetry with tighter control of an acceleration path, maximize thrust response specific scenarios, reduce fuel system hardware design margins by satisfying thrust bandwidth and disturbance rejection requirements, actively enforce linear behavior to provide more uniform plant dynamics, improve synchrophasing capability, minimize core speed overshoots (particularly as exacerbated by icing), decrease transit time through keep out zones (e.g., severe vibe zones), and/or dampen gearbox vibration modes for geared turbofans.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The core turbine engine 16 depicted in FIG. 1 includes a substantially tubular outer casing 18 that defines an annular inlet 20. The tubular outer casing 18 encases, in serial flow relationship, a compressor section including a low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) spool 36 drivingly connects the LP turbine 30 to the LP compressor 22.

The fan section 14 can include a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low pressure spool 36 across a power gear box 46. The power gear box 46 includes a plurality of gears for stepping down the rotational speed of the LP spool 36 to a more efficient rotational fan speed. It will be appreciated that additional configurations for the fan section 14 such as those that employ a non-ducted or non-variable pitch design are also contemplated.

Referring still to the embodiment of FIG. 1, the disk 42 is covered by rotatable front hub 48 aerodynamically contoured to promote an airflow through the plurality of fan blades 40. Additionally, the fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion 62 of the air 58 as indicated by arrow is directed or routed into the bypass airflow passage 56 and a second portion 64 of the air 58 as indicated by arrow is directed or routed into the LP compressor 22. The ratio between the first portion 62 of air 58 and the second portion 64 of air 58 is commonly known as a bypass ratio. The pressure of the second portion 64 of air 58 is then increased as it is routed through the HP compressor 24 and into the combustion section 26, where it is mixed with fuel and burned to provide combustion gases 66. Subsequently, the combustion gases 66 are routed through the hot flowpath, or hot-section flowpath, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the turbofan engine 10 depicted in FIG. 1 is by way of example only, and that in other embodiments, aspects of the present disclosure may additionally, or alternatively, be applied to any other suitable gas turbine engine. For example, in other embodiments, the turbofan engine 10 may instead be any other suitable aeronautical gas turbine engine, such as a turbojet engine, turboshaft engine, turboprop engine, etc. Additionally, in still other embodiments, the turbofan engine 10 may include or be operably connected to any other suitable accessory systems. Additionally, or alternatively, the turbofan engine 10 may not include or be operably connected to one or more of the accessory systems discussed above.

Figure 2:
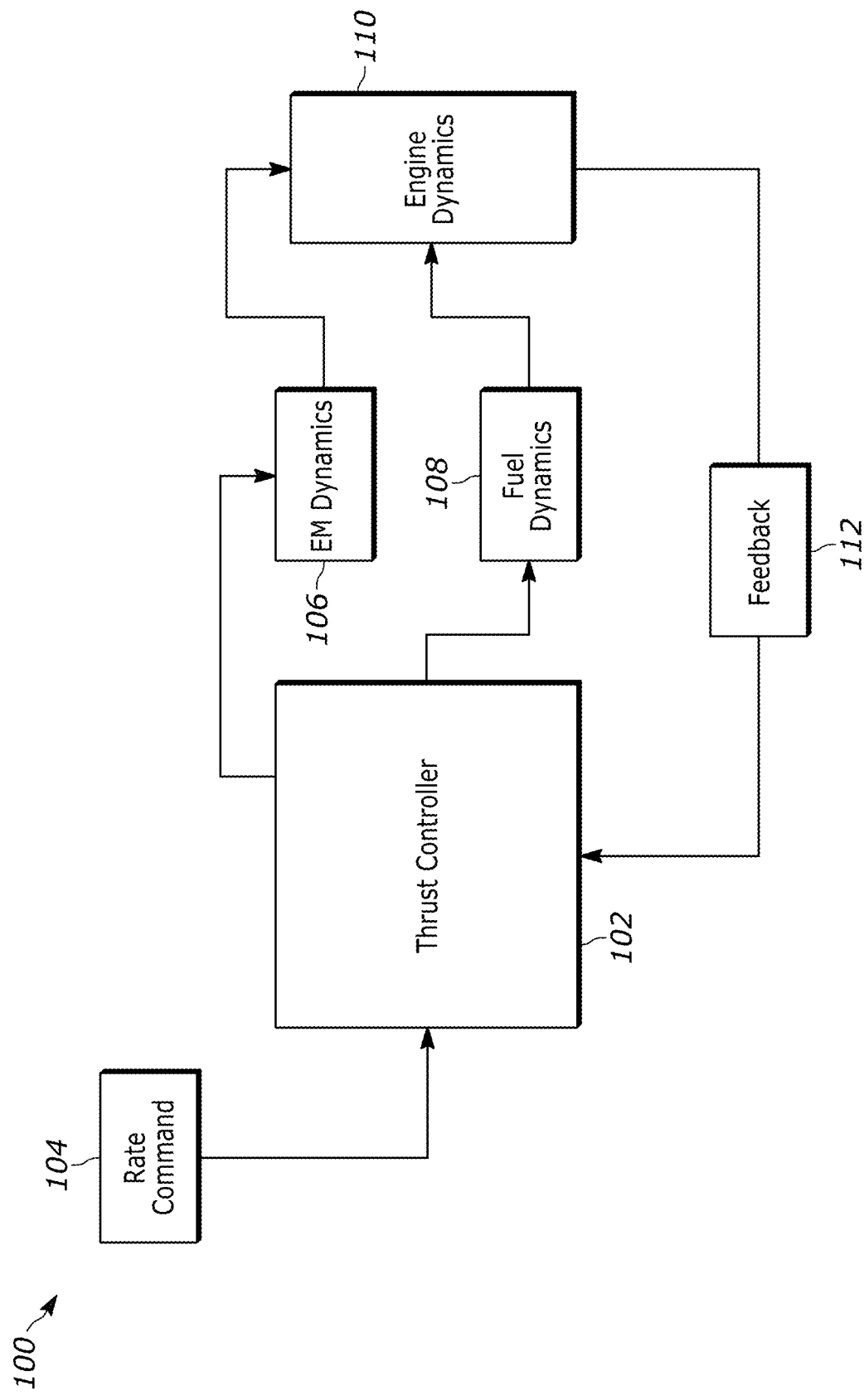
FIG. 2 is a block diagram of an engine control system in accordance with various embodiments of these teachings.

Referring now to FIG. 2, a block diagram of an engine control system 100 is shown. The engine control system 100 includes a thrust controller 102 that receives a rate command 104 for an engine such as the turbofan engine 10 and jointly manages electric machine (EM) dynamics 106 and fuel dynamics 108 of the turbofan engine 10 so that engine dynamics 110 of the turbofan engine 10 produce an output thrust rate from the turbofan engine 10 that is indicated by the rate command 104. It will be appreciated that the engine control system 100 is usable with engines having either ducted or un-ducted fans. In some embodiments, the rate command 104 can be calculated or generated by the thrust controller 102 as a function of a thrust currently being output by the turbo fan engine 10 and a newly demanded thrust to be output by the turbofan engine 10 received from one or more aircraft control interfaces. The rate command 104 can be calculated based on the specific hardware capabilities of the turbofan engine 10 to avoid stalling or other dangerous conditions and can take the form of one or more of a thrust, fan, or core speed trajectory.

Further, the thrust controller 102 can incorporate feedback 112 for use in managing the electric machine dynamics 106 and the fuel dynamics 108. The feedback 112 is a function of the engine dynamics 110 such that the feedback 112 provides an indication of the current thrust response for the turbofan engine 10 to the thrust controller 102. The thrust controller 102 can then modify control of the electric machine dynamics 106 and the fuel dynamics 108 to account for the current thrust response as indicated by the feedback 112 and ensure that the turbofan engine 10 achieves thrust rate as indicated by the rate command 104. In some embodiments, the electric machine dynamics 106 can operate to apply torque on the spools of the turbofan engine 10 in the kHz frequency ranges while the slower to respond fuel dynamics 108 can only operate in frequency ranges of around less than 10 Hz.

In general operation, a thrust amount and electrical load are set and the engine control system 100 splits application of power within the turbofan engine 10 and to other systems of an aircraft utilizing the engine control system 100. Then, when acceleration is demanded, a new ideal thrust rate is calculated and sent out as the rate command 104. Then, the engine control system 100 measures an error between the ideal rate and an actual rate and dually manages the electric machine dynamics 106 and fuel dynamics 108 to manipulate power split to minimize the rate error while maintaining the constant total electrical load being demanded by the aircraft. In particular, where the aircraft does not include an energy storage device (battery, ultracapacitor, etc.) management of the electric machine dynamics 106 can be limited to power split between the multiple electric machines in order to maintain the demanded aircraft electrical (meaning at least 2 electric machines are needed). However, if an energy storage device is available, management of the electric machine dynamics 106 is not limited to power split and consequently can be operated with a single electric machine. This additional flexibility afforded by the energy storage device enables improved control. For example, a disturbance on fan speed can be rejected by modulating a low-pressure electric machine while using the energy storage to keep the aircraft load and therefore a high-pressure electric machine constant.

Figure 3:
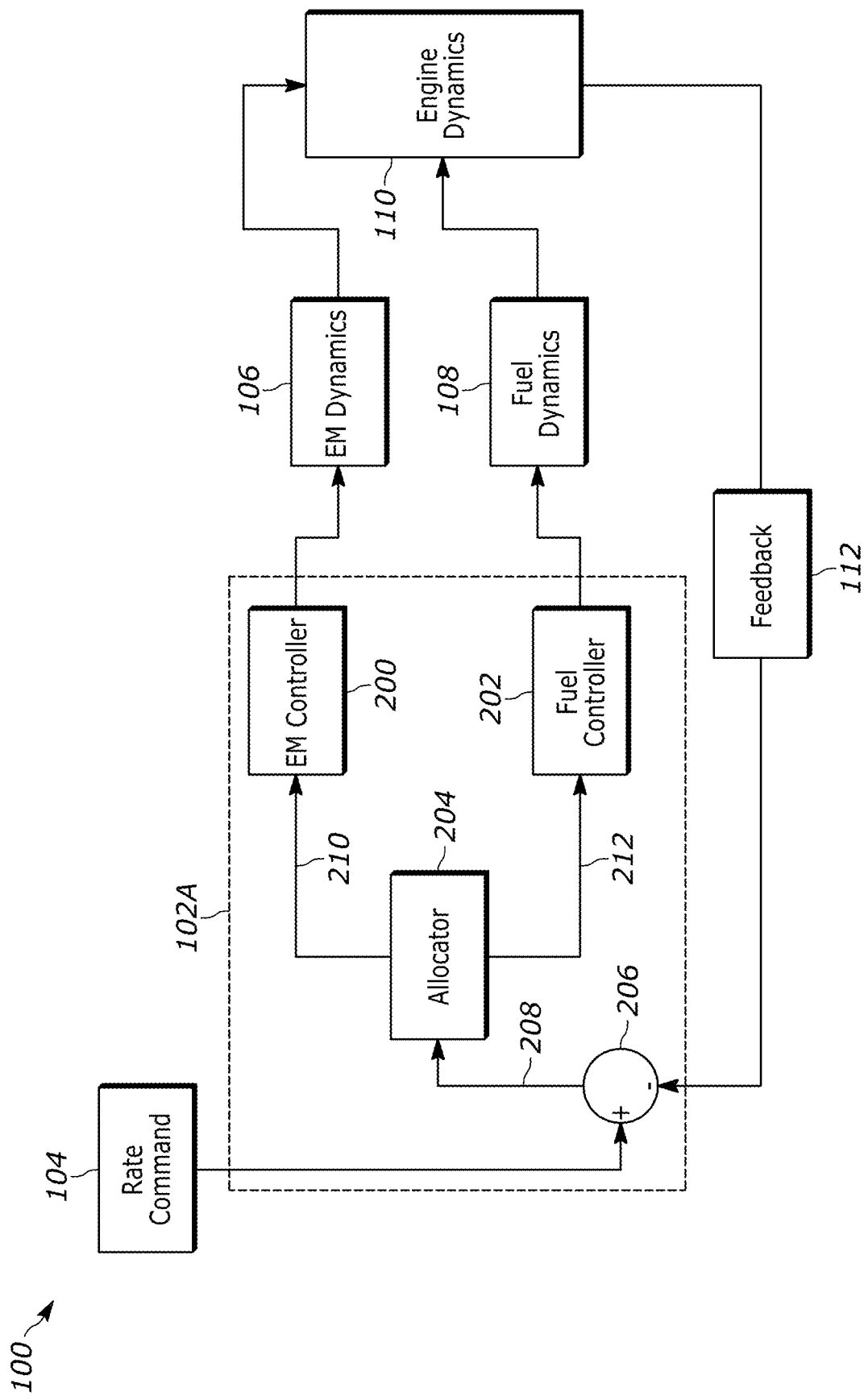
FIG. 3 is a block diagram of an engine control system in accordance with various embodiments of these teachings.

Turning now to FIG. 3, a block diagram for a signal allocation embodiment of the engine control system 100 is shown. In this embodiment, the thrust controller 102 of FIG. 2 can comprise a signal allocation controller 102A. The signal allocation controller 102A includes an electric machine controller 200, a fuel controller 202, a signal allocator 204 electrically coupled to the fuel controller 202 and the electric machine controller 200, and a first signal combiner 206. The first signal combiner 206 receives the rate command 104 and subtracts the feedback 112 therefrom to generate an error signal 208. Then, the signal allocator 204 generates an electric machine control signal 210 for the electric machine controller 200 to use in managing the electric machine dynamics 106 and a fuel control signal 212 for the fuel controller 202 to use in managing the fuel dynamics 108.

Figure 4:
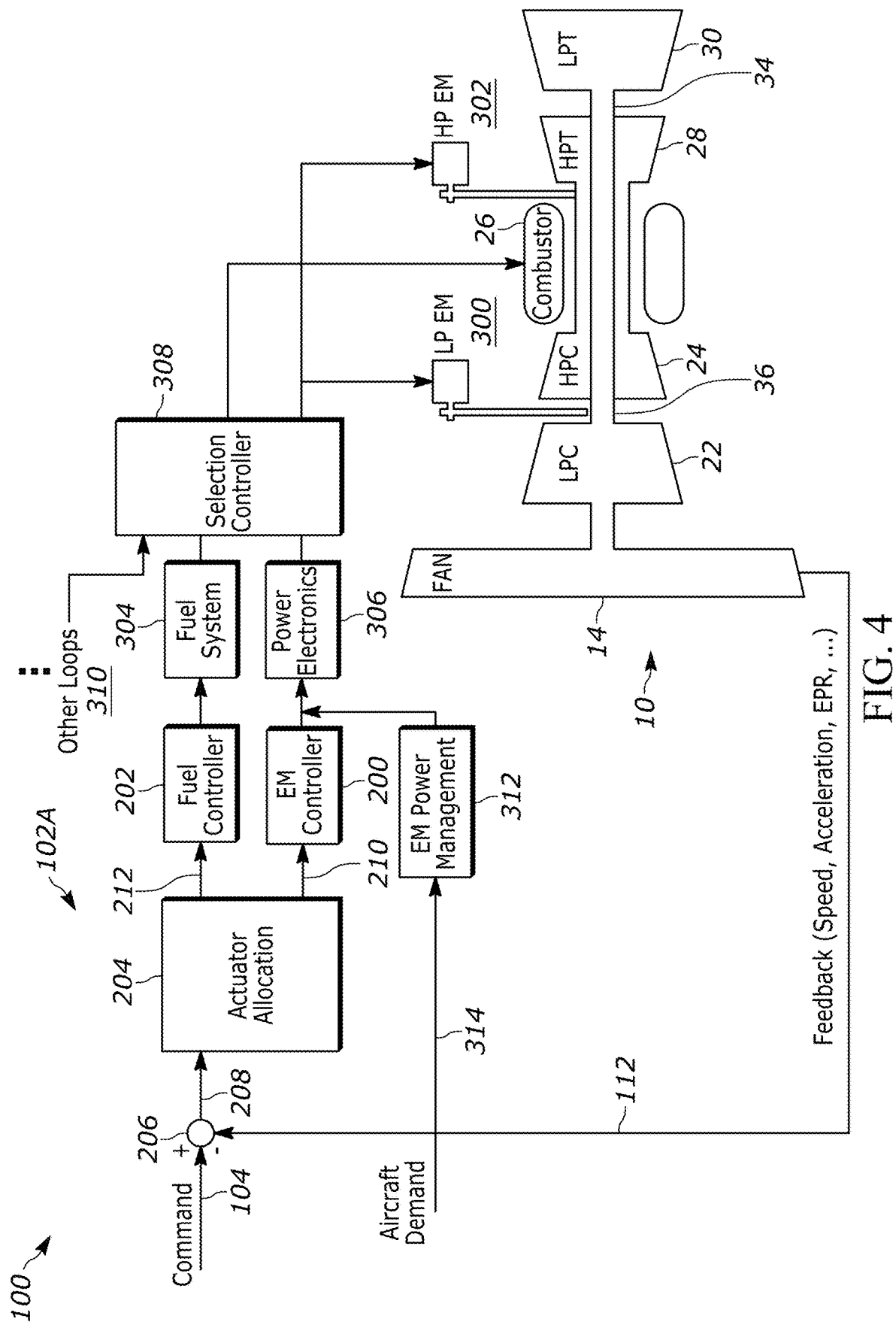
FIG. 4 is a schematic diagram of an engine control system in accordance with various embodiments of these teachings.

Turning now to FIG. 4, a schematic of the signal allocation controller 102A in conjunction with a turbofan or turboprop engine such as the turbofan engine 10 is shown. As seen in FIG. 4, the turbofan engine 10 can additionally include electric machines that are physically coupled (e.g., geared) to the spools of the turbofan engine 10 and used to apply positive torque to the spools for thrust generation and negative torque to the spools for power generation. In particular, the turbofan engine 10 can include a low-pressure electric machine 300 geared to the LP spool 36 and a high-pressure electric machine 302 geared to the HP spool 34. It should be appreciated that additional or fewer electric machines can be coupled to the LP spool 36 and/or the HP spool 34 and controlled according to the systems and methods described herein. Further, it will also be appreciated that embodiments with additional spools, beyond the LP spool 36 and/or the HP spool 34, that also include associated electric machines operable by the engine control system 100 are contemplated.

Further, the engine control system 100 can include a fuel supply system 304 electrically coupled to the fuel controller 202 and power electronics 306 electrically coupled the electric machine controller 200. Further still, the engine control system 100 can include a selection controller 308 electrically coupled to the fuel controller 202, the electric machine controller 200, and other control system loops 310 of the aircraft. Moreover, the engine control system 100 can include an electric machine power management controller 312 that receives an electricity demand 314. In some embodiments, the electric machine power management controller 312 can be integrated into the electric machine controller 200. Additionally, the feedback 112 can be sent from the fan section 14 to the signal allocation controller 102A and can include data indicative of the current speed, acceleration, engine pressure ratio, and other similar data.

In operation, the signal allocation controller 102A can generate the error signal 208 from the rate command 104 and feedback 112 using the first signal combiner 206, for example, by subtracting the feedback 112 from the rate command 104. Then, the signal allocator 204 can allocate the error signal 208 into the electric machine control signal 210 and the fuel control signal 212 and pass the signals to the electric machine controller 200 and the fuel controller 202, respectively. Next, the fuel controller 202 can produce the fuel dynamics 108 by directing the fuel supply system 304 to supply fuel to the combustion section 26 based on the fuel control signal 212. Similarly, the electric machine controller 200 can produce the electric machine dynamics 106 by directing the power electronics 306 to drive the low-pressure electric machine 300 and the high-pressure electric machine 302 to apply the positive or negative torque to the spools of turbofan engine 10.

Furthermore, in some embodiments, the electric machine controller 200 can work in conjunction with the electric machine power management controller 312 to ensure that the low-pressure electric machine 300 and the high-pressure electric machine 302 are primarily operated in the negative torque mode to generate and supply electricity that meets the electricity demand 314. For example, in some embodiments, the electric machine controller 200 and the electric machine power management controller 312 can prioritize the negative torque mode and electricity generation over the positive torque or thrust generating mode. In these embodiments, the electric machine controller 200 utilizes leftover electrical capacity from the application of the negative torque to apply the positive torque to the spools of the turbofan engine 10.

Figure 5:
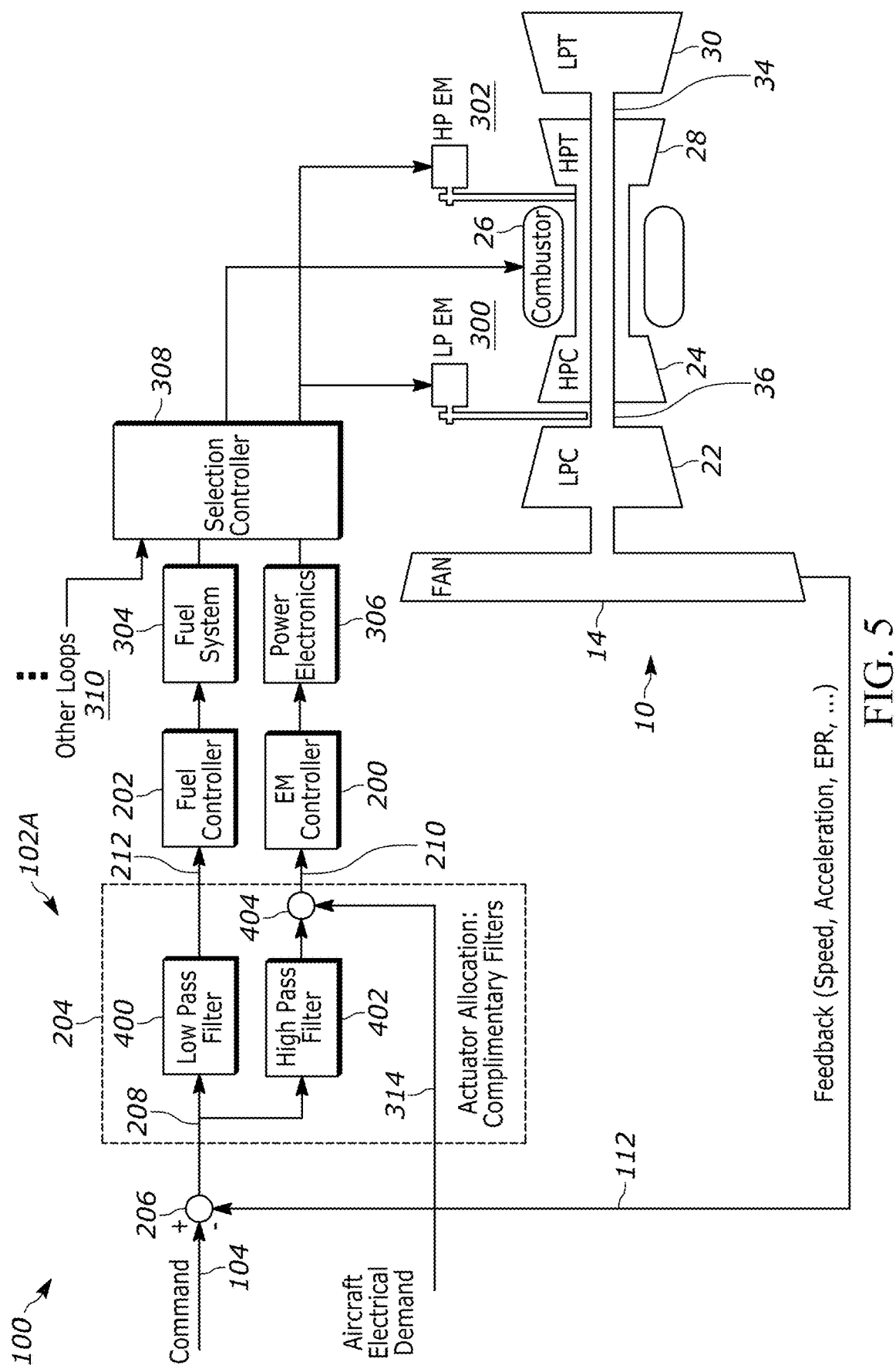
FIG. 5 is a schematic diagram of an engine control system in accordance with various embodiments of these teachings.

Turning now to FIG. 5, a schematic of the signal allocation controller 102A is shown. In this embodiment, the fuel control signal 212 can include low frequency portions of the error signal 208 and the electric machine control signal 210 can include high frequency portions of the error signal 208. In some embodiments, the high frequency portions of the error signal 208 and the low frequency portion of the error signal 208 can be spectrally decoupled from one another. The signal allocator 204 can include a first filter 400 that receives the error signal 208 and passes through the low frequency portions of the error signal 208 to generate the fuel control signal 212 and a second filter 402 that receives the error signal 208 and passes through the high frequency portions of the error signal 208 to generate the electric machine control signal 210. In some embodiments, the first filter 400 can include a low pass filter and the second filter 402 can include a high pass filter. The low pass filter and high pass filter are designed such that a sum thereof is unity. However, in some embodiments, the sum may roll off at higher frequencies to prevent aliasing and remove noise. Additionally or alternatively, the second filter 402 can include a bandpass filter that passes through the high frequency portions of the error signal 208 while also removing high frequency noise to preventing aliasing. Further, in some embodiments, the signal allocator 204 can include a second signal combiner 404 that combines and output of the second filter 402 with the electricity demand 314 to generate the electric machine control signal 210.

Figure 6:
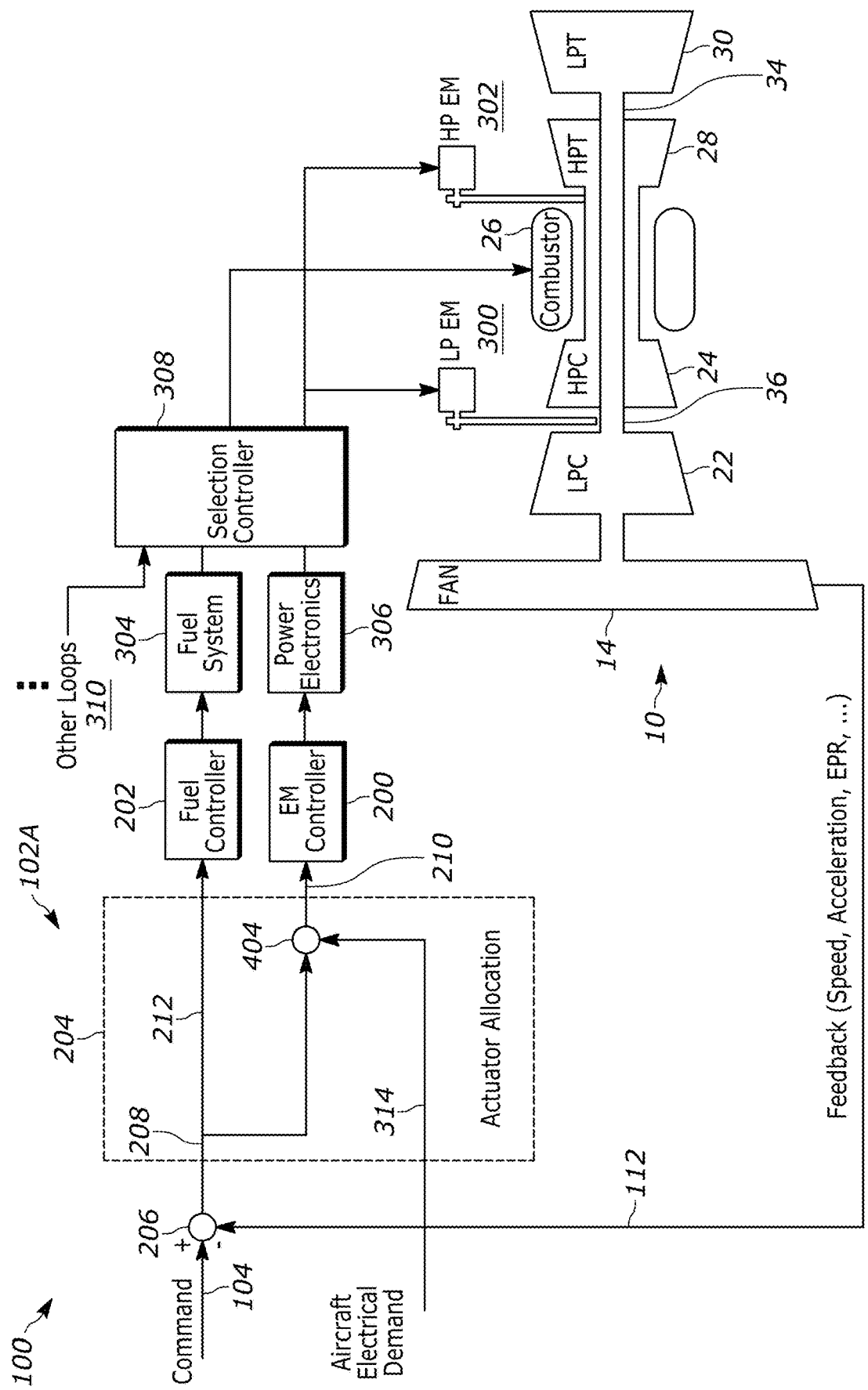
FIG. 6 is a schematic diagram of an engine control system in accordance with various embodiments of these teachings.

Turning now to FIG. 6, another schematic of the signal allocation controller 102A is shown. In this embodiment, the fuel control signal 212 and the electric machine control signal 210 can include the error signal 208 and the signal allocator 204 can directly pass the error signal 208 to the fuel controller 202 as the fuel control signal 212 and directly pass the error signal 208 to the electric machine controller 200 as the electric machine control signal 210. In these embodiments, the electric machine controller 200 is configured to process portions of the error signal 208 having a frequency that is at least 5 times and preferably in the range of at least 10-20 times greater than portions of the error signal processed by the fuel controller 202. Further, in some embodiments, the signal allocator 204 can include the second signal combiner 404 that combines the error signal 208 with the electricity demand 314 to generate the electric machine control signal 210.

It should also be noted that additional embodiments for the signal allocation controller 102A are contemplated wherein the size of the error signal 208 is used to allocate the error signal 208 into the electric machine control signal 210 and the fuel control signal 212. However, generally, the signal allocation controller 102A provides an improved thrust response over conventional systems by utilizing the low-pressure electric machine 300 and the high-pressure electric machine 302 to provide quick correction of the high frequency portions of the error signal 208 so that a burden of error correcting is lowered for the slower responding fuel controller 202. In particular, the fuel controller 202 can be configured to correct only the lower frequency portions of the error signal 208 resulting in significantly improved fuel savings and prolonged life for the turbofan engine 10.

Figure 7:
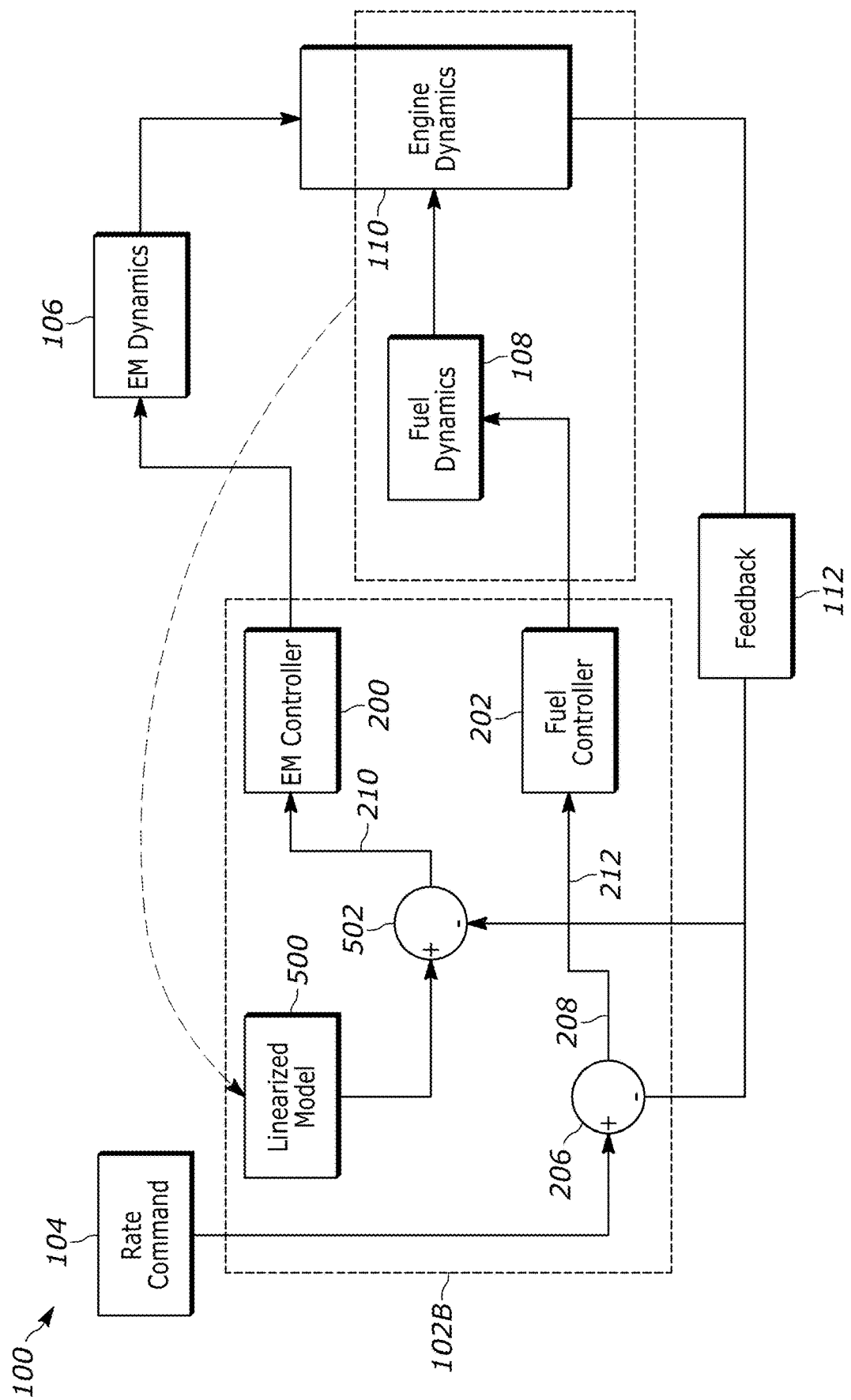
FIG. 7 is a block diagram of an engine control system in accordance with various embodiments of these teachings.

Turning now to FIG. 7, a block diagram for a disturbance observer embodiment of the engine control system 100 is shown. In this embodiment, the thrust controller 102 of FIG. 2 can comprise a disturbance observer controller 102B. The disturbance observer controller 102B includes the electric machine controller 200, the fuel controller 202, the first signal combiner 206, a linearized model 500 of the fuel dynamics 108 and engine dynamics 110 as ideally produced by the fuel controller 202, and a third signal combiner 502. The linearized model 500 can model ideal operation of the turbofan engine 10 by the fuel controller 202 in response to the error signal 208, which, in this embodiment, is equivalent to the fuel control signal 212. Further, the electric machine control signal 210 can include a second error signal generated by the third signal combiner 502 by subtracting the feedback 112 from an output of the linearized model 500 (e.g. an expected response of the turbofan engine 10 to the fuel controller 202). Various inputs for the linearized model 500 are contemplated, such as the rate command 104, the error signal 208, the feedback 112, and/or an output of the fuel controller 202.

Figure 8:
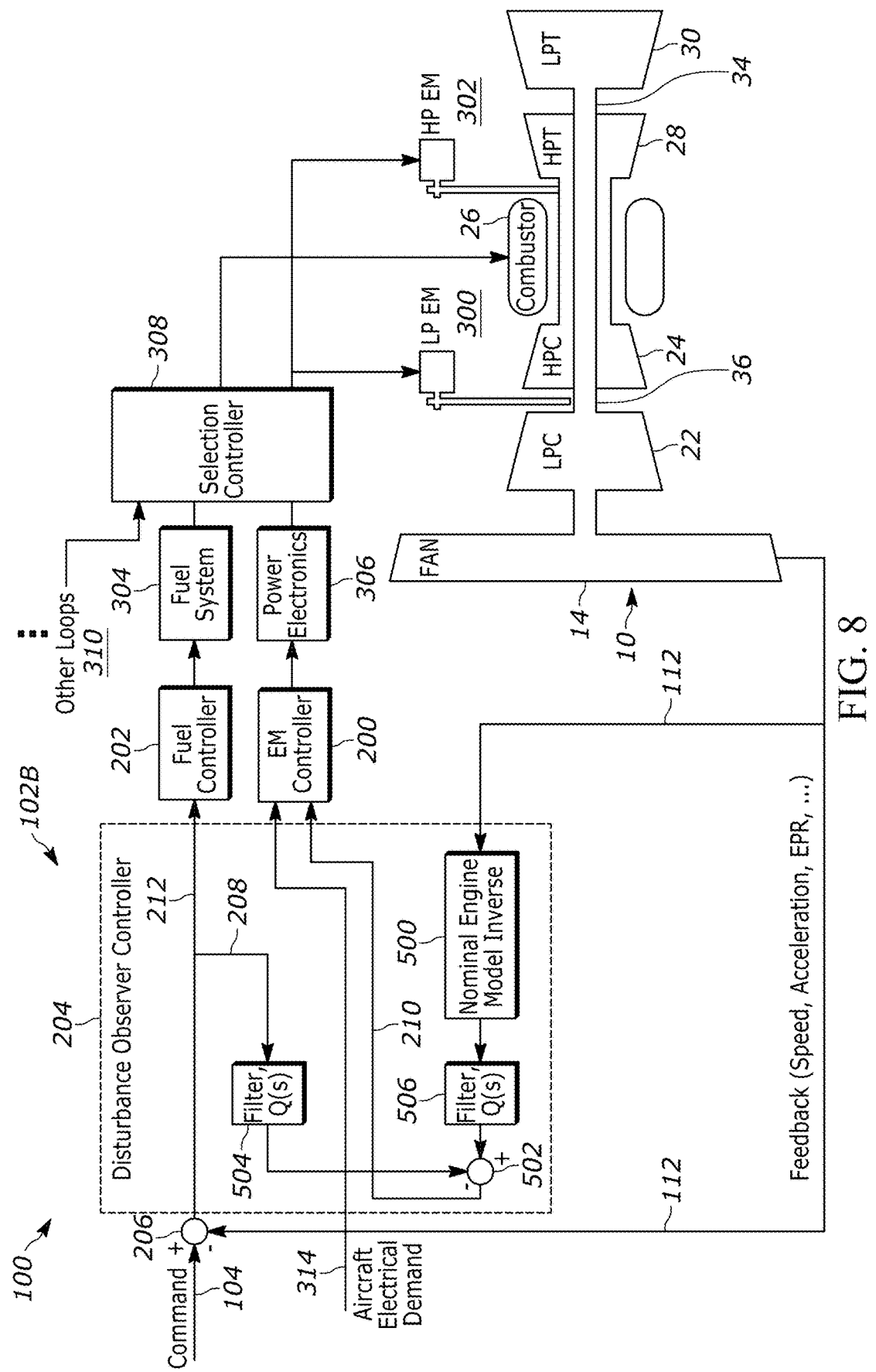
FIG. 8 is a schematic diagram of an engine control system in accordance with various embodiments of these teachings.

Turning now to FIG. 8, a schematic of an embodiment of the disturbance observer controller 102B in conjunction with a turbofan or turboprop engine such as the turbofan engine 10 is shown. As seen in FIG. 8, the turbofan engine 10 can include the low-pressure electric machine 300 and the high-pressure electric machine 302. Further, the engine control system 100 can include the fuel supply system 304 electrically coupled to the fuel controller 202, the power electronics 306 electrically coupled the electric machine controller 200, and the selection controller 308 electrically coupled to the fuel controller 202, the electric machine controller 200, and the other control system loops 310. Further still, the linearized model 500 can include a nominal inverse model that receives the feedback 112 as an input, a third filter 504, and a fourth filter 506. In some embodiments, the third filter 504 and fourth filter 506 can include identical low pass or band pass filters that reject disturbance below their shared cutoff frequency. In general, the third filter 504 and fourth filter 506 can be configured such that an action magnitude of the electric machine control signal 210 remains within a preconfigured control authority of the electric machine controller 200.

In operation, the disturbance observer controller 102B can generate the error signal 208 from the rate command 104 and feedback 112 using the first signal combiner 206. Then, the disturbance observer controller 102B can pass the error signal 208 to the fuel controller 202 as the fuel control signal 212 and generate the electric machine control signal 210 from the error signal 208 and an output of the linearized model 500. In particular, the disturbance observer controller 102B can generate the electric machine control signal 210 by processing the feedback 112 through the nominal inverse of the linearized model 500 to generate the expected response of the turbofan engine 10 and subtracting the error signal 208 as sent through the third filter 504 from the expected response as sent through the fourth filter 506. Next, the fuel controller 202 can produce the fuel dynamics 108 by directing the fuel supply system 304 to supply fuel to the combustion section 26 based on the fuel control signal 212. Similarly, the electric machine controller 200 can produce the electric machine dynamics 106 by directing the power electronics 306 to drive the low-pressure electric machine 300 and the high-pressure electric machine 302 to apply the positive or negative torque to the spools of turbofan engine 10. Further, as described in more detail herein in connection with at least FIGS. 4-6, the engine control system 100 can receive an electricity demand 314 that is fed to the electric machine controller 200 or combined with the electric machine control signal 210 so that the electric machine controller 200 operates the low-pressure electric machine 300 and high-pressure electric machine 302 to ensure generation of electricity sufficient to meet the electricity demand 314.

In various embodiments of the linearized model 500 deployed by the disturbance observer controller 102B, the disturbance observer controller 102B provides an improved thrust response over conventional systems by utilizing the low-pressure electric machine 300 and the high-pressure electric machine 302 to correct portions the error signal 208 that are within the preconfigured control authority of the electric machine controller 200. The corrected portions of the error signal in turn drive the actual response of the fuel controller 202, fuel supply system 304, and corresponding engine dynamics 110 towards the expected idealized response of the linearized model 500. This configuration simplifies engine design by eliminating much of the higher bandwidth errors so that engine performance more closely resembles what the linearized model 500 predicts. In some embodiments, the disturbance observer controller 102B can eliminate between about 5% and about 30% of the higher bandwidth errors.

It will be appreciated that while the engine control system 100 is schematically shown in FIGS. 4-6 and FIG. 8 in conjunction with the turbofan engine 10 of FIG. 1, functionality of the engine control system 100 is not limited to the specific configuration of the turbofan engine 10. Rather, the various embodiments of the engine control system 100 shown and described herein are configured to operate in conjugation with a variety of turbofan and/or turboprop engines that include a feedback output similar to the feedback 112 and controllable electric machines similar to the low-pressure electric machine 300 and the high-pressure electric machine 302.

The collective advantages of the various embodiments of the engine control system 100 as described herein can be further demonstrated with respect to the graphs shown in FIGS. 9-13. In particular, the graphs shown in FIGS. 9-13 show examples of various response characteristics of a turbofan engine, such as the turbofan engine 10, when controlled by embodiments of the engine control system 100 described herein over a thrust ramp up period. The thrust ramp up period corresponds to a transition period for the thrust of the engine controlled by the engine control system 100 and speed of the aircraft between an initial steady state speed and thrust at time T0 and a new desired steady state speed or thrust at time T1. The specific slope and shape of the thrust between time T0 and time T1 corresponds to the thrust rate of the aircraft over that time period.

Figure 9:
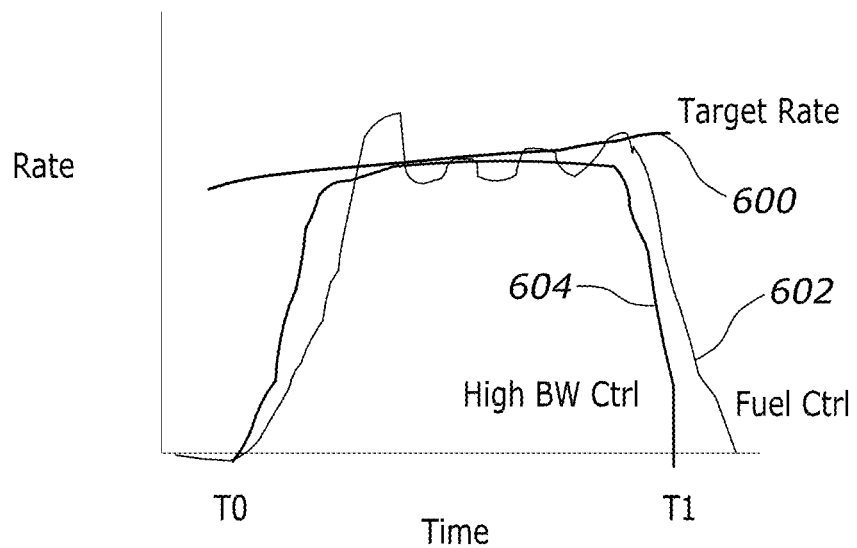
FIG. 9 is a graph of a thrust rate over time for a gas turbine engine employing an engine control system in accordance with various embodiments of these teachings.
Figure 10:
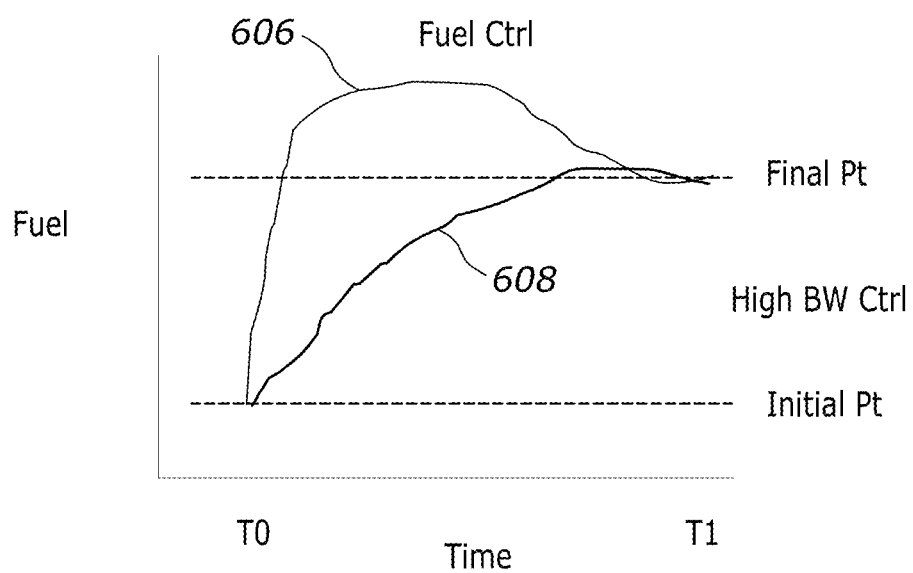
FIG. 10 is a graph of fuel consumption over time for a gas turbine engine employing an engine control system in accordance with various embodiments of these teachings.

First, FIG. 9 is a comparison graph over time between a target thrust rate 600 for the engine controlled by the engine control system 100, a conventional fuel control thrust rate 602 for a turbofan engine, and a high bandwidth (BW) control thrust rate 604 for the turbofan engine resulting from use of the engine control system 100 described herein. As seen in FIG. 9, the conventional fuel control thrust rate 602 can oscillate more severely around the target thrust rate 600 when compared with the high BW control thrust rate 604 produced by the engine control system 100 described herein. The reduction in oscillations can have dramatic improvements on the wear and tear of the turbofan engine, fuel efficiency, and other notable improvements described herein. For example, as seen in FIG. 10, conventional fuel usage over time 606 can, during the ramp up period, rise quickly to and vastly overshoot the fuel amount needed to maintain the steady state speed or thrust after time T1. However, during the same ramp up period, the high BW control fuel usage over time 608 can produce a gradual fuel increase until arriving at the new steady state fuel amount. The more gradual ramp up can be attributed to the use of the low-pressure electric machine 300 and high-pressure electric machine 302 to supplement the application of thrust from the fuel controller 202 and the fuel supply system 304.

Figure 11:
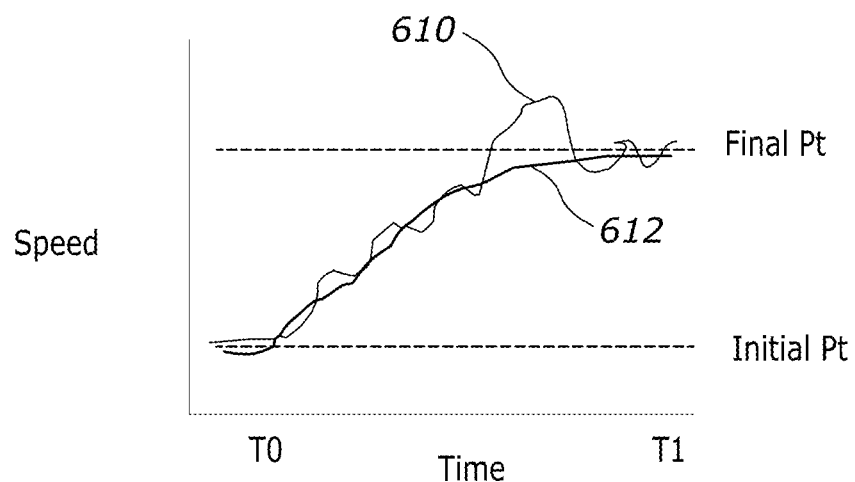
FIG. 11 is a graph of speed over time for a gas turbine engine employing an engine control system in accordance with various embodiments of these teachings.

Second and similar to the fuel response, the increase of the speed of the aircraft and/or the engine spools over the ramp up period can be more gradual when the engine control system 100 is employed as described herein. For example, as seen in FIG. 11, a conventional fuel control speed 610 can be more chaotic and overshoot the final target speed during the ramp up period, while, in contrast, a high BW control speed 612 can gradually increase to the final target speed with minimal or negligible overshooting. The more gradual speed increase reduces engine wear and tear and generally provided a more predicable response for the engine controlled by the system 100.

Figure 12:
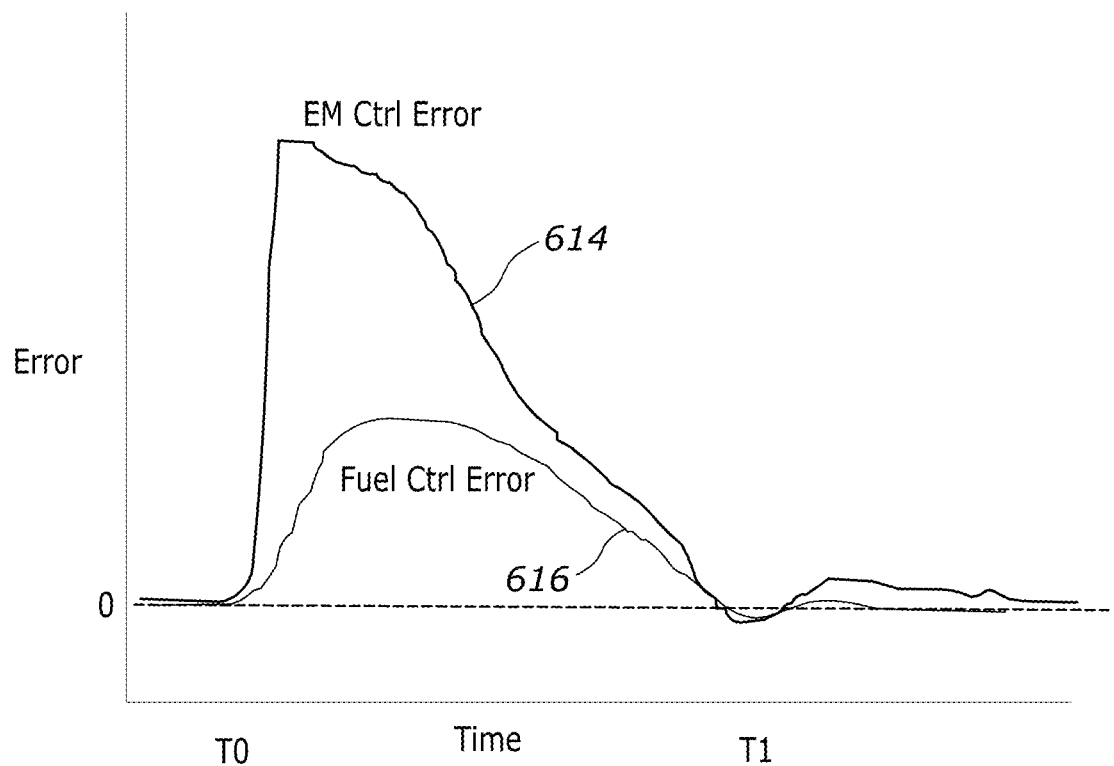
FIG. 12 is a graph of error signal over time for an engine control system in accordance with various embodiments of these teachings.
Figure 13:
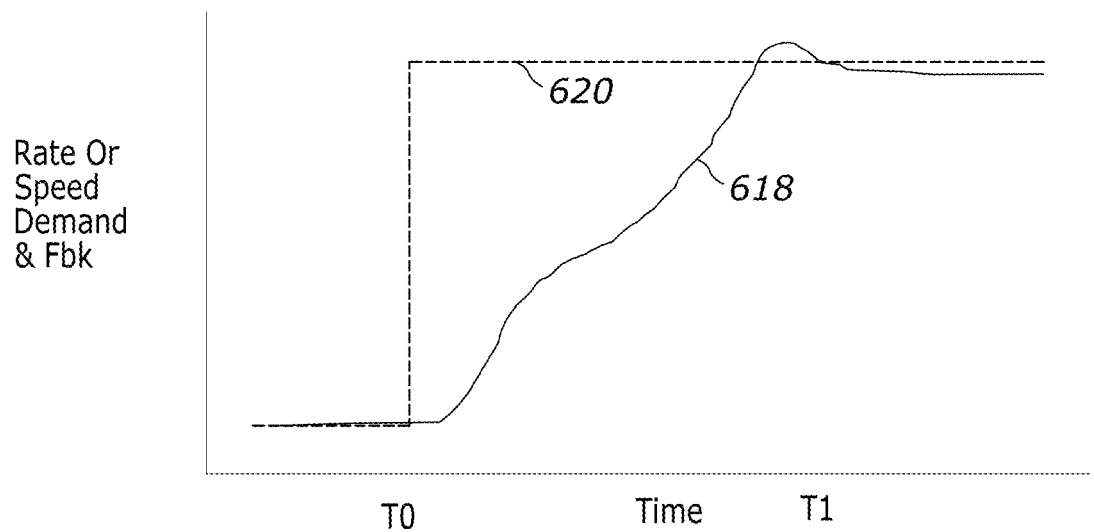
FIG. 13 is a graph of an engine feedback signal for an engine control system in accordance with various embodiments of these teachings.

Finally, turning to FIG. 12 and FIG. 13, the overall response of the engine controlled by the engine control system 100 is shown. First, FIG. 12 shows EM control error portions 614 of the error signal 208 over time and fuel control error portions 616 of the error signal 208 over time. As seen in FIG. 12, the EM control error portions 614 quickly increase at the start of the ramp up period but are quickly remedied by the engine control system 100 managing the electric machine dynamics 106. Simultaneously, the fuel control error portions 616 follow a slower more gradual path up and down before the final target speed and steady state condition are reached. The gradual path is more suited to the slower responding fuels system. Separating out the EM control error portions 614 and the fuel control error portions 616 as described herein can produce a thrust response 618 over time as shown in FIG. 13. As seen in FIG. 13, when the engine control system 100 is used, the thrust response 618 can ramp up to the final thrust 620 quickly and smoothly with only a minimal overshoot around time T1 as compared to systems employing traditional fuel-based control systems. The thrust response 618 from use of the engine control system 100 represents a tighter controlled thrust response, minimized thrust asymmetry with a tighter controlled acceleration path, improved synchrophasing capability, minimized core speed overshoots, decreases transit time through keep out zones, dampened gearbox vibration modes, maximized thrust response for military engines, and/or other numerous benefits as described herein over the thrust response for systems employing traditional fuel-based control systems.

It will also be appreciated that the various embodiments of the engine control system 100 described herein are also operable to control and dampen high frequency or other variations in the thrust output of a controlled engine operating in a steady state thrust condition. In some of these embodiments, the engine control system 100 can set the rate command 104 to be zero once the new steady state thrust is achieved. From there, the thrust controller 102 can operate the EM dynamics 106 and the fuel dynamics 106 to maintain the steady state thrust while correcting and dampening any high frequency or other variations.

Further aspects of the disclosure are provided by the subject matter of the following clauses:

1. An engine control system comprising a fuel controller that directs supply of fuel to a turbine engine based on a fuel control signal; an electric machine controller that directs one or more electric machines to apply positive torque to the turbine engine based on an electric machine control signal; and a signal allocator electrically coupled to the fuel controller and the electric machine controller that generates the fuel control signal and the electric machine control signal from an error signal.

2. The engine control system of any preceding clause further comprising a signal combiner electrically coupled to the signal allocator, wherein the signal combiner receives a feedback signal from the turbine engine and a rate command, and wherein the signal combiner generates the error signal by subtracting the feedback signal from the rate command.

3. The engine control system of any preceding clause wherein the fuel control signal includes low frequency portions of the error signal and the electric machine control signal includes high frequency portions of the error signal.

4. The engine control system of any preceding clause wherein the signal allocator comprises a first filter that receives the error signal and passes through the low frequency portions of the error signal to generate the fuel control signal; and a second filter that receives the error signal and passes through the high frequency portions of the error signal to generate the electric machine control signal.

5. The engine control system of any preceding clause wherein the first filter is a low pass filter and the second filter is a high pass filter.

6. The engine control system of any preceding clause wherein the signal allocator directly passes the error signal to the fuel controller as the fuel control signal and directly passes the error signal to the electric machine controller as the electric machine control signal.

7. The engine control system of any preceding clause wherein the electric machine controller is configured to process portions of the error signal having a frequency that is at least five times greater than portions of the error signal processed by the fuel controller.

8. The engine control system of any preceding clause wherein the electric machine controller receives an electricity demand, and wherein the electric machine controller directs the one or more electric machines to apply negative torque to the turbine engine to generate sufficient electricity to satisfy the electricity demand.

9. The engine control system of any preceding clause wherein the electric machine controller utilizes leftover electrical capacity from the application of the negative torque to apply the positive torque to the turbine engine.

10. An engine control system comprising: a fuel controller that directs supply of fuel to a turbine engine based on a first error signal; an electric machine controller that directs one or more electric machines to apply positive torque to the turbine engine based on an electric machine control signal; and a disturbance observer electrically coupled to the electric machine controller, wherein the disturbance observer generates a second error signal, the second error signal being for an expected response of the turbine engine to the fuel controller, and wherein the disturbance observer generates the electric machine control signal from the second error signal.

11. The engine control system of any preceding clause wherein the disturbance observer receives a feedback signal from the turbine engine and generates the second error signal by subtracting the feedback signal from the expected response.

12. The engine control system of any preceding clause wherein the disturbance observer generates the expected response by processing the first error signal through a linearized model of operation of the turbine engine by the fuel controller.

13. The engine control system of any preceding clause wherein the disturbance observer generates the second error signal by processing a feedback signal from the turbine engine through an inverse linearized model of operation of the turbine engine by the fuel controller to generate the expected response; and subtracting the first error signal from the expected response.

14. The engine control system of any preceding clause wherein the disturbance observer generates the second error signal by processing a feedback signal from the turbine engine through an inverse linearized model of operation of the turbine engine by the fuel controller to generate the expected response; and subtracting the first error signal as sent through a first filter from the expected response as sent through a second filter.

15. The engine control system of any preceding clause wherein the electric machine controller receives an electricity demand, and wherein the electric machine controller directs the one or more electric machines to apply negative torque to the turbine engine to generate sufficient electricity to satisfy the electricity demand.

16. The engine control system of any preceding clause wherein the electric machine controller utilizes leftover electrical capacity from the application of the negative torque to apply the positive torque to the turbine engine.

17. A method for controlling engine thrust, the method comprising: receiving a rate command; receiving a feedback signal from a turbine engine; generating a fuel control signal and an electric machine control signal from the rate command and the feedback signal; sending the fuel control signal to a fuel controller of the turbine engine; sending the electric machine control signal to an electric machine controller; directing, via the fuel control signal, supply of fuel to the turbine engine based on the fuel control signal; and directing, via the electric machine control signal, an electric machine to apply positive torque to the turbine engine based on the electric machine control signal.

18. A method for controlling engine thrust, the method comprising: generating a fuel control signal and an electric machine control signal from a rate command and a feedback signal from a turbine engine; directing, via the fuel control signal sent to a fuel controller of the turbine engine, supply of fuel to the turbine engine based on the fuel control signal; and directing, via the electric machine control signal sent to an electric machine controller, an electric machine to apply positive torque to the turbine engine based on the electric machine control signal.

19. The method of any proceeding clause further comprising generating the fuel control signal and the electric machine control signal from the rate command and the feedback signal by subtracting the feedback signal from the rate command to generate an error signal; directly passing the error signal to the fuel controller as the fuel control signal; and directly passing the error signal to the electric machine controller as the electric machine control signal.

20. The method of any proceeding clause further comprising generating the fuel control signal and the electric machine control signal from the rate command and the feedback signal by subtracting the feedback signal from the rate command to generate an error signal; filtering the error signal into low frequency portions and high frequency portions; passing through the low frequency portions to the fuel controller as the fuel control signal; and passing through the high frequency portions to the electric machine controller as the electric machine control signal.

21. The method of any proceeding clause further comprising generating the fuel control signal and the electric machine control signal from the rate command and the feedback signal by subtracting the feedback signal from the rate command to generate a first error signal; passing the first error signal to the fuel controller as the fuel control signal; processing the feedback signal through an inverse linearized model of operation of the turbine engine by the fuel controller to generate an expected response; subtracting the first error signal as sent through a first filter from the expected response as sent through a second filter to generate a second error signal; and passing the second error signal to the electric machine controller as the electric machine control signal.

22. The method or engine control system of any proceeding clause wherein the one or more electric machines are physically geared to one or more spools of the turbofan engine.

23. The method or engine control system of any proceeding clause wherein the one or more electric machines include a low-pressure electric machine geared to a low-pressure spool of the turbofan engine and a high-pressure electric machine geared to a high-pressure spool of the turbofan engine.

24. The method or engine control system of any proceeding clause wherein the rate command is generated by a thrust controller as a function of a thrust currently being output the turbofan engine and a newly demanded thrust to be output by the turbofan engine, the newly demanded thrust being received from one or more aircraft control interfaces.

25. The method or engine control system of any proceeding clause wherein the rate command is calculated based on specific hardware capabilities of the turbofan engine so as to avoid stalling or other dangerous conditions.

26. The method or engine control system of any proceeding clause wherein the rate command takes a form of one or more of a thrust, fan, or core speed trajectory.

27. The method or engine control system of any proceeding clause wherein the electric machine controller operates to apply torque on spools of the turbofan engine in a kHz frequency range and wherein fuel controller operates in a frequency range of around less than 10 Hz.

28. The method or engine control system of any proceeding clause wherein the electric machine controller and the fuel controller mange a power split between the one or more electric machines so as to minimize the error signal while maintaining a constant total electrical load being demanded.

29. The method or engine control system of any proceeding clause wherein the electric machine controller and the fuel controller mange a power split between the one or more electric machines and an energy storage device so as to minimize the error signal while maintaining a constant total electrical load being demanded.

30. The method or engine control system of any proceeding clause wherein the first filter and the second filter are configured to have a unity sum.

31. The method or engine control system of any proceeding clause wherein the electric machine controller is configured to process portions of the error signal having a frequency that is at least 5 times greater than portions of the error signal processed by the fuel controller.

32. The method or engine control system of any proceeding clause wherein the first filter is a bandpass filter.

33. The method or engine control system of any proceeding clause wherein the second filter is a bandpass filter.

34. The method or engine control system of any proceeding clause wherein the first filter and the second filter are identical bandpass filters that that reject disturbance below a shared cutoff frequency.

34. The method or engine control system of any proceeding clause wherein the first filter and the second filter are configured such that an action magnitude of the electric machine control signal remains within a preconfigured control authority of the electric machine controller.

35. The method or engine control system of any proceeding clause wherein the disturbance observer eliminates between about 5% and about 30% of higher bandwidth errors.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. An engine control system comprising:
   a fuel controller that directs supply of fuel to a turbine engine based on a fuel control signal;
   an electric machine controller that directs one or more electric machines to apply positive torque to the turbine engine based on an electric machine control signal;
   a signal allocator electrically coupled to the fuel controller and the electric machine controller that generates the fuel control signal and the electric machine control signal from an error signal; and
   a signal combiner electrically coupled to the signal allocator, wherein the signal combiner receives a feedback signal from the turbine engine and a rate command signal, and wherein the signal combiner generates the error signal by subtracting the feedback signal from the rate command signal.

2. The engine control system of claim 1, wherein the feedback signal provides an indication of a current thrust response of the turbine engine.

3. The engine control system of claim 1, wherein the feedback signal originates from a fan section of the turbine engine.

4. The engine control system of claim 3, wherein the feedback signal includes data indicative of a speed, an acceleration, or an engine pressure ratio.

5. The engine control system of claim 1 wherein the fuel control signal includes low frequency portions of the error signal and the electric machine control signal includes high frequency portions of the error signal.

6. The engine control system of claim 5 wherein the signal allocator comprises:
   a first filter that receives the error signal and passes through the low frequency portions of the error signal to generate the fuel control signal; and
   a second filter that receives the error signal and passes through the high frequency portions of the error signal to generate the electric machine control signal.

7. The engine control system of claim 1 wherein the electric machine controller receives an electricity demand, and wherein the electric machine controller directs the one or more electric machines to apply negative torque to the turbine engine to generate sufficient electricity to satisfy the electricity demand.

8. The engine control system of claim 7 wherein the electric machine controller utilizes leftover electrical capacity from the application of the negative torque to apply the positive torque to the turbine engine.

9. The engine control system of claim 1 further comprising a fuel system coupled to the fuel controller.

10. A method of controlling operation, the method comprising:
    generating a fuel control signal and an electric machine control signal from an error signal;
    directing a supply of fuel to a turbine engine based on the fuel control signal; and
    directing one or more electric machines to apply positive torque to the turbine engine based on an electric machine control signal;
    wherein the fuel control signal includes low frequency portions of the error signal and the electric machine control signal includes high frequency portions of the error signal.

11. The method of claim 10 further comprising, at a signal combiner, receiving a feedback signal from the turbine engine and a rate command signal, and generating the error signal by subtracting the feedback signal from the rate command signal.

12. The method of claim 11, wherein the feedback signal provides an indication of a current thrust response of the turbine engine.

13. The method of claim 11, wherein the feedback signal originates from a fan section of the turbine engine.

14. The method of claim 13, wherein the feedback signal includes data indicative of a speed, an acceleration, or an engine pressure ratio.

15. The method of claim 10 further comprising:
    receiving the error signal and passing through the low frequency portions of the error signal to generate the fuel control signal; and receiving the error signal and passing through the high frequency portions of the error signal to generate the electric machine control signal.

16. The method of claim 10 further comprising applying the fuel control signal to a fuel system.

17. A method of controlling operation, the method comprising:
- generating a fuel control signal and an electric machine control signal from an error signal;
- directing a supply of fuel to a turbine engine based on the fuel control signal; and directing one or more electric machines to apply positive torque to the turbine engine based on an electric machine control signal;
- receiving an electricity demand, and directing the one or more electric machines to apply negative torque to the turbine engine to generate sufficient electricity to satisfy the electricity demand.

18. The method of claim 17, further comprising utilizing leftover electrical capacity from the application of the negative torque to apply the positive torque to the turbine engine.

\* \* \* \* \*